United States Patent [19]

Ruckdashel

[11] Patent Number: 6,018,800
[45] Date of Patent: Jan. 25, 2000

[54] SECURITY MECHANISM FOR A COMPUTER SYSTEM

[75] Inventor: Glenn A. Ruckdashel, Boise, Ohio

[73] Assignee: Micron Electronics, Inc., Nampa, Id.

[21] Appl. No.: 08/925,115

[22] Filed: Sep. 8, 1997

[51] Int. Cl.[7] ...................................................... H04L 9/00
[52] U.S. Cl. ........................................... 713/200; 713/202
[58] Field of Search ..................................... 713/200, 202; 395/186, 188.01

[56] References Cited

U.S. PATENT DOCUMENTS

| | | | |
|---|---|---|---|
| 5,774,545 | 6/1998 | Raghavachari | 380/4 |
| 5,832,214 | 11/1998 | Kikinis | 395/188.01 |
| B1 4,604,708 | 10/1997 | Lewis | 395/188.01 |

*Primary Examiner*—Dennis M. Butler
*Attorney, Agent, or Firm*—Seed and Berry LLP

[57] ABSTRACT

A method for ensuring secure delivery of a computer system to a customer. The computer system includes a motherboard with a processor, a read-only memory, and a programmable memory. The method encodes onto the read-only memory an identification number for the computer system. The computer system is sent to the customer via a first delivery channel and the identification number is sent to the customer via a second delivery channel. When the computer system is initially booted after being sent, the computer system prompts for input of the identification number for the computer system. When the computer system receives an identification number that matches the identification number encoded onto the read-only memory, it stores an indication of the match in the programmable memory indicating that the identification number has been verified to be correct so that the computer system operates normally thereafter. When the computer system does not receive an identification number that matches the identification number encoded on the read-only memory, it performs a security measure to ensure that the computer system operates abnormally thereafter. In this way, the computer system and the identification number are sent separately to reduce the possibility of an unintended recipient receiving both the computer system and the identification number. In addition, if an unintended recipient receives the computer system and not the identification number, the computer system operates abnormally.

41 Claims, 6 Drawing Sheets

SECURITY MECHANISM FOR A COMPUTER SYSTEM

TECHNICAL FIELD

The present invention relates generally to computer systems and in particular to the secure delivery of computer systems to a purchaser.

BACKGROUND OF THE INVENTION

The number of computer systems, such as personal computers, being purchased through mail-order channels is increasing. To purchase a computer system through a mail-order channel, a purchaser contacts the vendor of the computer system and places an order to purchase the computer system. The purchaser may contact the vendor using a telephone, electronic mail, or U.S. mail. The purchaser typically pays for the computer system using a credit card or some other electronic form of payment. When payment is received, the vendor ships the computer system to a location designated by the purchaser.

The number of computer systems purchased through mail-order channels is increasing because of several advantages over the purchase of computer systems through traditional retail channels. First, the overhead of maintaining retail outlets is avoided, which results in a lower cost for the purchaser and a higher profit margin for the vendor. Second, the computer systems can be delivered very quickly (e.g., the next business day) via a common carrier to the location specified by the customer. Thus, the purchaser can avoid having to personally travel to a retail outlet and avoid having to personally transport the computer system. Third, when the vendor is also the manufacturer of the computer system, the vendor can assemble the computer system with a hardware and software configuration that is tailored to the purchaser's requirements. Thus, the purchaser avoids costly upgrades to "standard" configurations to achieve the desired configuration and avoids paying for unneeded hardware or software that is included in standard configurations.

Unfortunately, once a computer system is shipped by a vendor, it is susceptible to being stolen in transit to the purchaser's location. Since computer systems generally and personal computer systems in particular are considered to be fungible and are worth several thousand dollars each, there is a thriving market for stolen computer systems. Thus, the stolen computer systems are easily fenced. This theft of computer systems that are shipped to purchasers is an increasing problem for vendors of computer systems who sell their computer systems through the mail-order channels. Indeed, this theft of computer systems can have a very serious adverse effect on the profitability of the vendors.

SUMMARY OF THE INVENTION

Some embodiments of the present invention provide a security method for ensuring that a newly delivered computer system performs normally for the intended recipient and abnormally for any unintended recipient. To help ensure such performance, the manufacturer of the computer system encodes an identification number into the computer system. When the computer system is initially booted, the computer system prompts for input of the identification number of the computer system. The computer system then determines whether an identification number is input that matches the encoded identification number. When the identification numbers match, the computer system stores an indication of the match so that the computer system operates normally thereafter. When they do not match, the computer system performs a security measure so that the computer system operates abnormally thereafter.

DETAILED DESCRIPTION OF THE INVENTION

Figure 1:
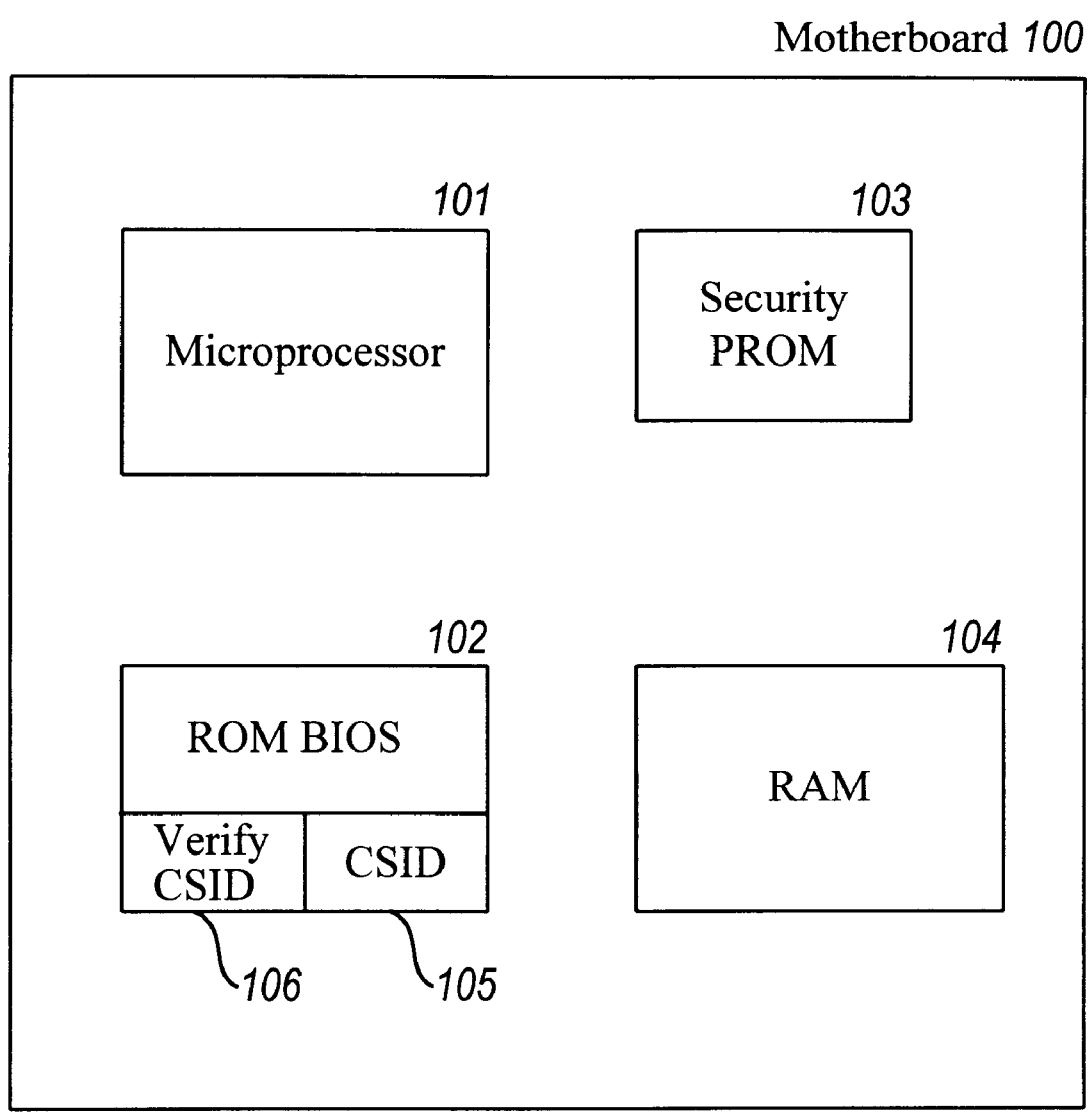
FIG. 1 is a block diagram illustrating exemplary contents of the motherboard of a computer system that verifies its identification number.

The present invention provides a method and system for ensuring secure delivery of a computer system from a supplier (e.g., vendor) to a customer. In one embodiment, the computer system has a motherboard that contains a processor, a read-only memory ("ROM"), and a programmable read-only memory ("PROM"). When the manufacturer assembles the computer system, the read-only memory, such as the ROM containing the basic input/output system ("BIOS") of personal computers, is encoded with an identification number for the computer system. After the supplier receives an order to purchase the computer system, the supplier ships the computer system to the customer via a delivery channel (e.g., a common carrier). The supplier also supplies the identification number for the computer system to the customer via a different delivery channel (e.g., via the telephone when the customer places the order to purchase the computer system). When the customer receives the computer system, the customer performs an initial boot of the computer system. The manufacturer of the computer system has programmed the computer system to prompt the customer to input the identification number when the computer system is initially booted. Upon receiving the identification number input by the customer, the computer system verifies whether the received identification number matches the identification number encoded on the ROM of the motherboard. If the identification numbers match, then the computer system stores in the PROM an indication that the identification number has been verified to be correct. The computer system then continues with its normal operation. If, however, the identification numbers do not match, then the computer system assumes that the computer system has been stolen (or at least received by an unintended recipient) because the correct identification number was not input and presumably only the customer knows the correct identification number. The computer system then performs a security measure (e.g., automatically powering down) to prevent the normal operation of the computer system. By preventing the normal operation, the computer system becomes practically worthless. Thus, a person would have little incentive to steal such a computer system unless the identification number was known. However, since the identification number is supplied to the customer via a delivery channel different from the delivery channel used to ship the computer system, it is unlikely that a thief will have the correct identification number for a stolen computer system.

The manufacturer of the computer system can tailor the security measures used to prevent normal operation to the desired level of abnormal operation. At one extreme, the security measure would automatically power down the computer system. When the computer system is subsequently booted, the computer system then checks the programmable read-only memory to determine whether the identification number was verified to be correct. If the identification number has already been verified to be correct, then the computer system continues its normal operation. Otherwise, the computer system automatically powers down the computer system. At the other extreme, the security measure could allow the computer system to operate normally except that periodically the computer system would re-prompt for input of the identification until the correct identification number is input. The frequency of the re-prompting can be set to adversely affect the usefulness of the computer system. These and other possible security measures are described below in greater detail.

FIG. 1 is a block diagram illustrating exemplary contents of the motherboard of a computer system that verifies its identification number. The motherboard 100 includes microprocessor 101, ROM BIOS 102, security PROM 103, and random access memory ("RAM") 104. The identification number, referred to as computer system identification ("CSID") 105, has been encoded onto the ROM BIOS. The CSID is preferably a string of letters and numbers such that it would be highly unlikely that an unintended recipient of the computer system could forge the correct CSID. For example, if the string contains ten alphanumeric characters, then there are $36^{10}$ ($\cong 10^{15}$) possible CSIDs. With such a large number of possible CSIDs, it would be virtually impossible to forge a CSID. The verify CSID component 106 is invoked during the boot procedure to verify whether the user has the correct CSID. The verify CSID component first checks the security PROM to determine whether the CSID has been verified to be correct on a previous boot of the computer system. If so, the verify CSID component returns control so that the computer system can proceed with its normal operation. If not, the verify CSID component prompts the user to input the CSID. If the input CSID does not match the encoded CSID, then the verify CSID component performs the security measure. If they do match, then the verify CSID component stores a verified-to-be-correct indication in the security PROM so that the computer system can operate normally when subsequently booted. The CSID is preferably encoded in memory contained in the motherboard, since the motherboard is typically the most expensive component of a computer system. Although an unintended recipient (e.g., thieve) could replace the motherboard to bypass the security measure, it would be very expensive to do so. Nevertheless, the CSID could be encoded other than on the motherboard. For example, the CSID could be encoded on a hard disk of the computer system. However, since disk drives are relatively inexpensive, the security measure could be bypassed by replacing the hard disk. Also, the security PROM could be a variety of different memory devices, such as, an electrically erasable PROM ("EEPROM") and need not be located on the motherboard.

Figure 2:
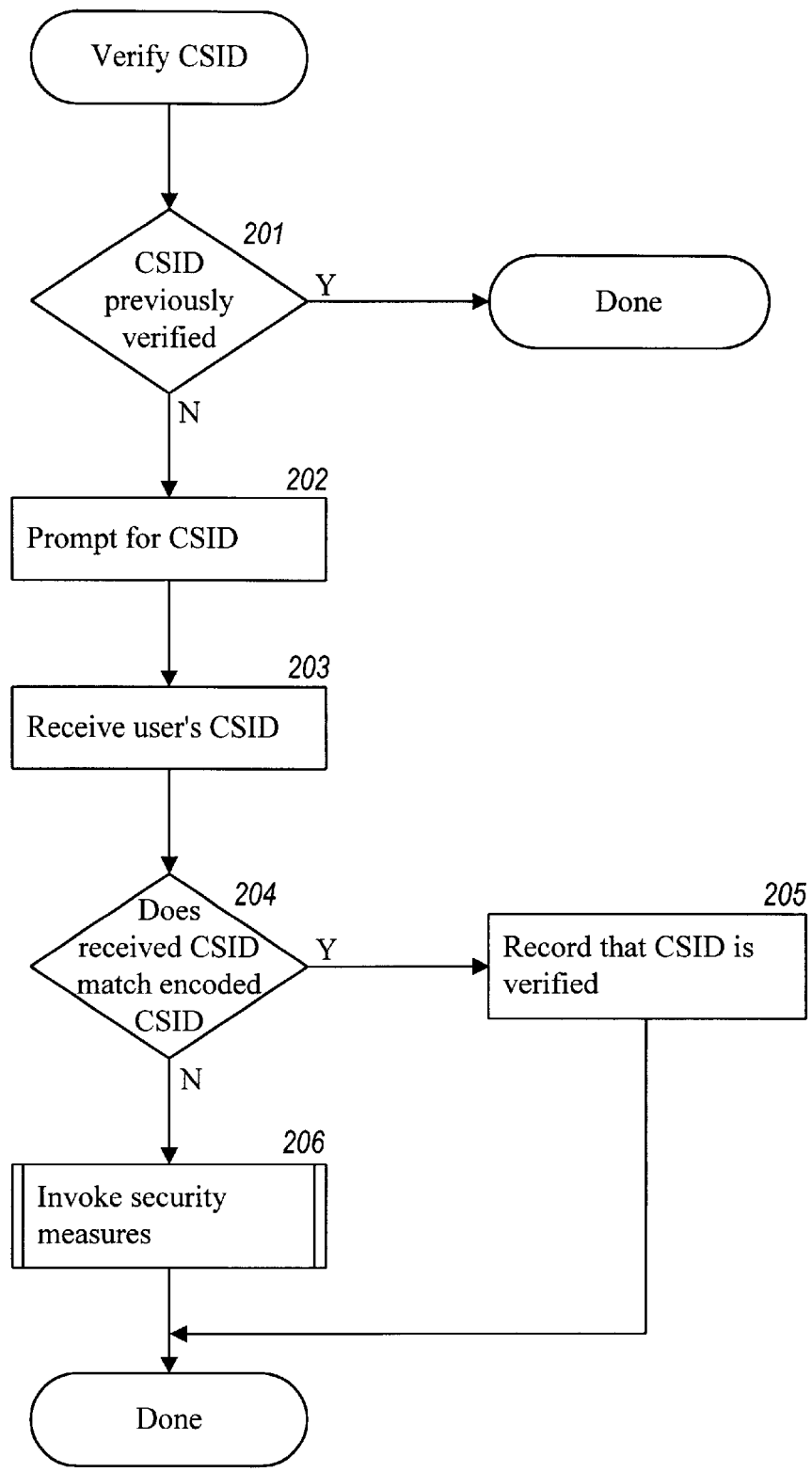
FIG. 2 is a flow diagram of a routine that is an implementation of the verify CSID component.

FIG. 2 is a flow diagram of a routine that is an implementation of the verify CSID component. When the computer system is booted, the boot procedure invokes this routine to verify that the user of the computer system has the correct CSID. In step 201, the routine checks the security PROM to determine whether the CSID has previously been verified to be correct. If the CSID has previously been verified to be correct, then the routine completes so that the computer system can operate normally, else the routine continues at step 202. In step 202, the routine prompts the user to enter the CSID that was provided by the supplier of the computer system. In step 203, the routine receives the user's input of the CSID. In step 204, if the received CSID matches the CSID encoded on the ROM BIOS, then the routine continues at step 205, else the routine continues at step 206. In step 205, the routine records in the security PROM that the CSID has been verified to be correct and completes so that the computer system can operate normally. In step 206, the routine performs one of the various security measures to ensure that the computer system operates abnormally.

Figure 3:
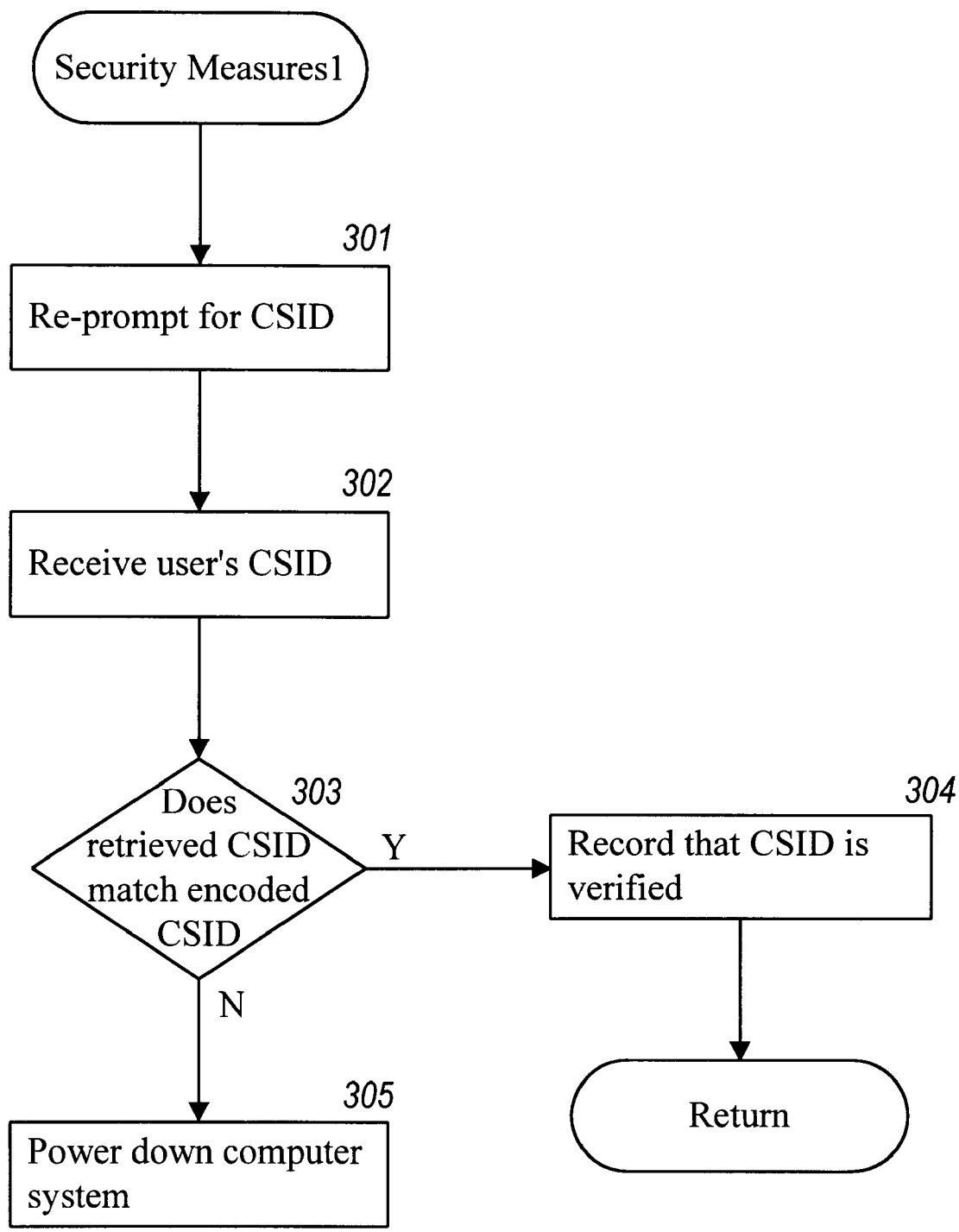
FIG. 3 is a flow diagram illustrating a first security measure routine.

FIGS. 3, 4, and 5A–5B are flow diagrams illustrating different embodiments of the security measures. FIG. 3 is a flow diagram illustrating a first security measure routine. This security measure routine allows the user another opportunity to input the correct CSID and powers down the computer if the input CSID is not correct (i.e., does not match the encoded CSID). In general, the re-input of the CSID can be attempted several times before abnormal operation of the computer system begins. This re-inputting allows the user an opportunity to correct any error when inputting the CSID. In step 301, the routine re-prompts the user to input the CSID. In step 302, the routine receives the user's CSID. In step 303, if the received CSID matches the CSID encoded on the ROM BIOS, then the routine continues at step 304, else the routine continues at step 305. In step 304, the routine records in the security PROM that the CSID has been verified to be correct and returns so that the computer system operates normally. In step 305, the routine powers down the computer system. The powering down of the computer system can be performed by sending a signal via an output port to a device connected to the power supply of the computer system.

Figure 4:
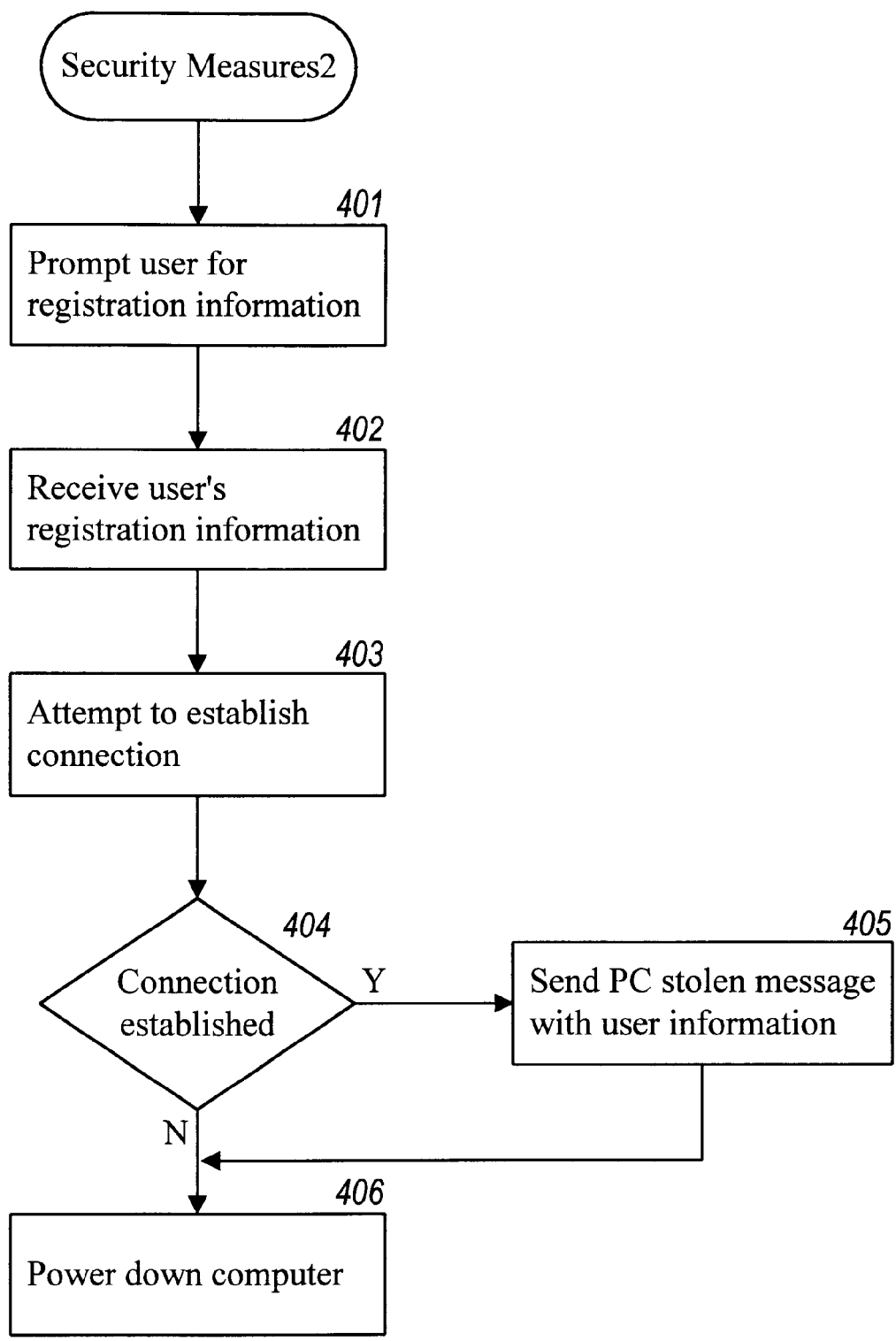
FIG. 4 is a flow diagram illustrating a second security measure routine.

FIG. 4 is a flow diagram illustrating a second security measure routine. This security measure attempts to elicit the user's identification (e.g., user's name or company name) and then attempts to establish a connection with the supplier and report this information to the supplier. In step 401, the routine prompts the user for their identification. This prompting can be under the guise that the computer system will use the identification when addressing the user. For example, the prompt could be "Please enter your first and last name so that the computer system can tailor its salutations to you." In step 402, the routine receives the user's identification. In step 403, the routine attempts to establish a connection with the supplier. The establishment of the connection can be attempted by dialing a predefined phone number designated by the supplier or by establishing an Internet connection. If the routine attempts to dial the predefined phone number, then the routine may enable the caller identification (i.e., "caller ID") of the phone line. In this way, the supplier can record the phone number associated with the phone line on which the call is made. In step 404, if the routine has established the connection, then the routine continues at step 405, else the routine continues at step 406. In step 405, the routine sends the received user's identification to the supplier via the established connection. In step 406, the routine powers down the computer system.

Figure 5A:
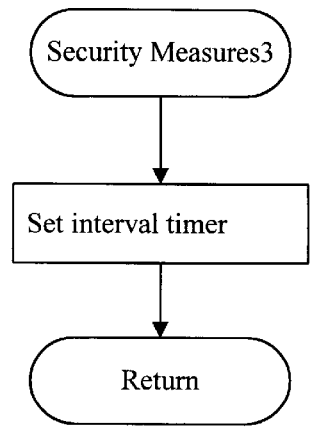
FIG. 5A is a flow diagram illustrating the processing performed by the third security measure when the computer system is booted.
Figure 5B:
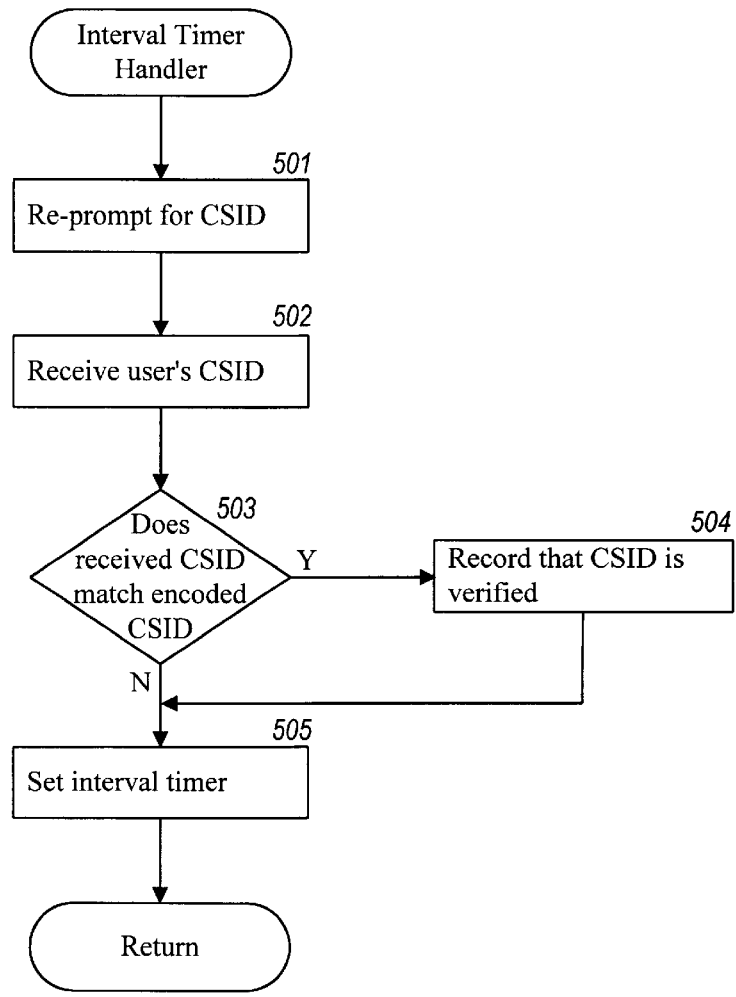
FIG. 5B is a flow diagram illustrating the processing performed by the third security measure at the periodic intervals.

FIGS. 5A–5B are flow diagrams illustrating a third security measure routine. This security measure periodically prompts the user to input the CSID until the correct CSID has been input. FIG. 5A is a flow diagram illustrating the processing performed by the third security measure when the computer system is booted. This routine sets an interval timer and returns. When the interval timer expires, during otherwise normal operation of the computer system, then the computer system invokes the routine illustrated in FIG. 5B. FIG. 5B is a flow diagram illustrating the processing performed by the third security measure at the periodic intervals. This routine allows the user to re-input the CSID. In step 501, the routine re-prompts the user to input the CSID. In step 502, the routine receives the user's CSID. In step 503, if the received CSID matches the CSID encoded on the ROM BIOS, then the routine continues at step 504, else the routine continues at step 505. In step 504, the routine records in the security PROM that the CSID has been verified to be correct and returns so that the computer system operates normally. In step 505, the routine resets the interval timer. The interval timer may be set at such frequent intervals that the effective use of the computer system is severely degraded. Also, when the interval timer expires, if the CSID has not yet been verified to be correct, then the computer system may attempt to establish a connection with the vendor as described above.

Figure 6:
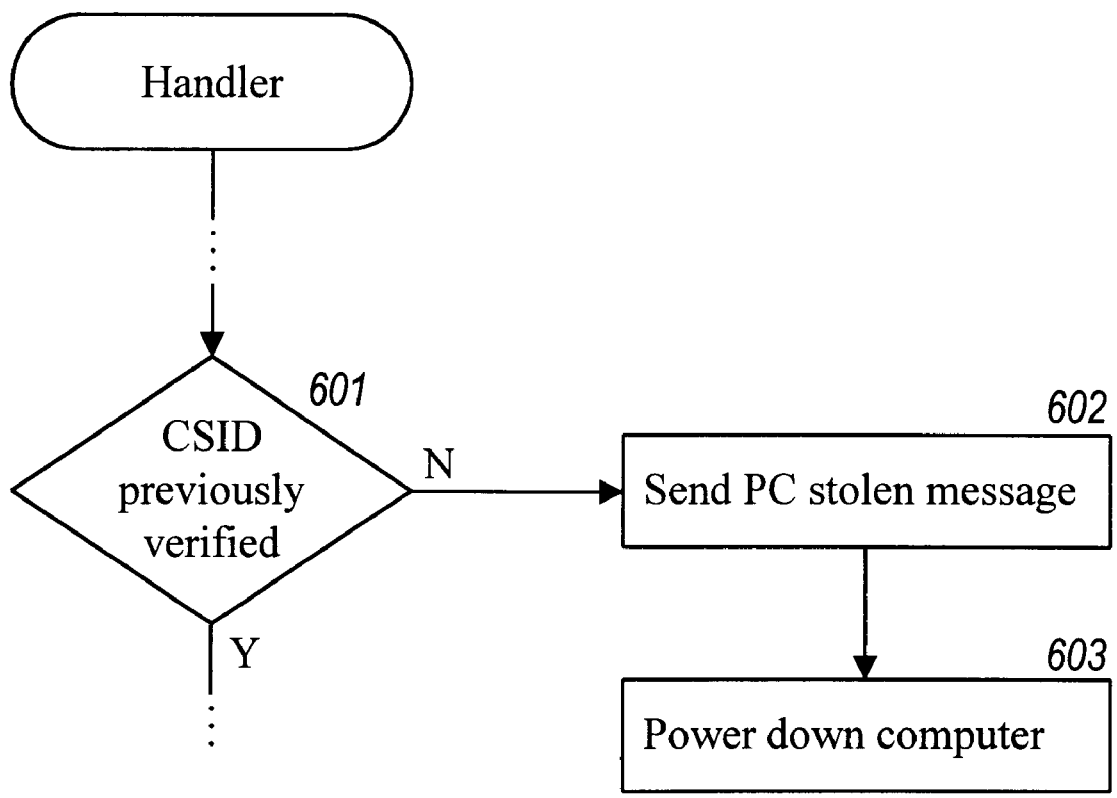
FIG. 6 is a flow diagram illustrating an additional security measure that may be used on the computer system.

FIG. 6 is a flow diagram illustrating an additional security measure that may be used on the computer system. This routine represents a portion of a communications handler, such as a device driver for a modem or an Internet browser. Whenever the user attempts to establish a connection using this modified handler, the handler first checks whether the CSID has previously been verified to be correct. If the CSID has not been verified to be correct, then the computer system attempts to send a message that the computer system has been stolen to the supplier via the connection. In step 601, the handler checks the security PROM to determine whether the CSID has been verified to be correct. If verified to be correct, the handler continues its normal operation. If not verified to be correct, then the handler sends a message to the supplier in step 602 and then powers down the computer system in step 603. Alternatively, the handler can continue with its normal operation rather than powering down to reduce the possibility that the user becomes aware that the supplier has been notified. Also, if a connection is not established, the handler can attempt to establish a connection periodically during execution of the handler.

From the foregoing it will be appreciated that, although specific embodiments of the invention have been described herein for purposes of illustration, various modifications may be made without deviating from the spirit and scope of the invention. For example, various other security measures can be employed by the computer system. One such other security measure is to allow the computer system to only execute a special computer program through which the intended recipient can obtain the correct CSID from the vendor. Another security measure is to introduce what appears to the user to be random errors into the operating system. For example, the keyboard handler can be programmed to occasionally interpret a key incorrectly. The goal of such security measures is to adversely affect the usefulness of the computer system. The scope of the present invention is defined by the following claims.

I claim:

1. A method for ensuring secure delivery of a computer system to a customer, the computer system having a motherboard with a processor, a read-only memory, and a programmable read-only memory, the method comprising:

encoding onto the read-only memory an identification number for the computer system;

sending the computer system to the customer via a first delivery channel;

sending the identification number for the computer system to the customer via a second delivery channel;

when the computer system is initially booted after being sent, prompting for input of the identification number for the computer system;

receiving as input an identification number for the computer system;

when the received identification number matches the identification number encoded on the read-only memory, storing an indication of the match in the programmable read-only memory indicating that the identification number has been verified to be correct so that the computer system operates normally thereafter; and when the received identification number does not match the identification number encoded on the read-only memory, performing a security measure to ensure that the computer system operates abnormally thereafter whereby the computer system and the identification number are sent separately to reduce the possibility of an unintended recipient receiving both the computer system and the identification number and whereby if an unintended recipient receives the computer system and not the identification number, the computer system operates abnormally.

2. The method of claim 1 wherein the read-only memory contains a basic input/output system.

3. A method for ensuring secure delivery of a computer system to a customer, the computer system having a read-only memory, the method comprising:

encoding onto the read-only memory an identification for the computer system;

sending the computer system to the customer via a first delivery channel;

providing the identification for the computer system to the customer via a second delivery channel;

when the computer system is initially booted after being sent, prompting for input of the identification for the computer system;

receiving as input an identification for the computer system;

when the received identification matches the identification encoded onto the read-only memory, setting an indication so that the computer system operates normally thereafter; and when the received identification number does not match the identification number encoded on the read-only memory, performing a security measure to ensure that the computer system operates abnormally thereafter.

4. The method of claim 3 wherein the security measure includes powering down the computer system.

5. The method of claim 3 wherein the security measure includes periodically re-prompting for input of the identification.

6. The method of claim 5 wherein the re-prompting occurs frequently so that use of the computer system is degraded.

7. The method of claim 3 wherein the security measure includes allowing execution only of a secure program through which the customer can obtain the identification of the computer system.

8. The method of claim 7 wherein the secure program communicates with a remote computer system to obtain the identification of the computer system.

9. The method of claim 3 wherein the security measure includes reporting theft of the computer system.

10. The method of claim 3 wherein the security measure includes obtaining identifying information from a user of the computer system and reporting the obtained identifying information.

11. The method of claim 3 wherein the security measure includes enabling caller identification of a telephone number and dialing a telephone number so that the calling telephone number is available to the dialed telephone.

12. The method of claim 3 wherein the security measure includes automatically powering down the computer system whenever the computer system is subsequently powered up.

13. A security method in a computer system comprising:
   encoding in the computer system an identification of the computer system;
   when the computer system is booted;
   prompting for input of the identification of the computer system;
   determining whether an input received matches the encoded identification;
   when a match is determined before a predetermined number, greater than zero, of mismatches are determined, storing an indication of the match so that the computer system no longer prompts for input of the identification of the computer system; and
   when the predetermined number greater than zero of mismatches are determined, performing a security measure.

14. The method of claim 13 wherein the computer system has a motherboard and the identification of the computer system is encoded onto the motherboard.

15. The method of claim 13 wherein the computer system has a read-only memory containing a basic input/output system and the identification of the computer system is encoded onto the read-only memory.

16. The method of claim 13 wherein the indication of the match is stored on a memory device so that when the computer system is next booted, the indication can be checked and re-prompting for input of the identification can be bypassed.

17. The method of claim 16 wherein the memory on which the indication is stored is a programmable read-only memory.

18. The method of claim 13 wherein the security measure includes powering down the computer system.

19. The method of claim 13 wherein the security measure includes periodically re-prompting for input of the identification.

20. The method of claim 19 wherein the re-prompting occurs frequently so that use of the computer system is degraded.

21. The method of claim 13 wherein the security measure includes allowing execution only of a secure program through which a customer can obtain the identification of the computer system.

22. The method of claim 21 wherein the secure program communicates with a remote computer system to obtain the identification of the computer system.

23. The method of claim 13 wherein the security measure includes reporting theft of the computer system to a remote computer system.

24. The method of claim 13 wherein the security measure includes obtaining identifying information from a user of the computer system and reporting the obtained identifying information to a remote computer system.

25. The method of claim 13 wherein the computer system is connected to a telephone line and wherein the security measure includes enabling caller identification on the telephone line and dialing a telephone number so that the calling telephone number is available to the dialed telephone.

26. The method of claim 13 wherein the security measure includes automatically powering down the computer system whenever the computer system is subsequently powered up.

27. A secure computer system having a motherboard, the motherboard comprising:
   a microprocessor;
   an encoded identification number of the computer system; and
   a verify identification number component configured to control the microprocessor to prompt a user to input an identification number unless a match has occurred before a predetermined number of mismatches have occurred, the match occurring when the user input matches the encoded identification number, a mismatch occurring when the user input does not match the encoded identification number and, when the predetermined number of mismatches occurs, to abnormally operate the computer system.

28. The computer system of claim 27 wherein the computer system includes a read-only memory onto which the identification number is encoded and onto which instructions that implement the verify identification number component are encoded.

29. The computer system of claim 27 wherein the motherboard includes a programmable memory and wherein the verify identification number component stores an indication in the programmable memory when the input identification number matches the encoded identification number.

30. The computer system of claim 29 wherein the verify identification number component bypasses the prompting when the indication is stored.

31. A computer-readable medium for a computer system having a prompter, an input device, and a comparison device, the medium containing:
   an encoded identification number of the computer system; and
   instructions for causing the computer system to use the prompter to prompt a user to input with the input device an identification number unless the comparison device has indicated that a match has occurred before a predetermined number of mismatches have occurred, the match occurring when the user input matches the encoded identification number, a mismatch occurring when the user input does not match the encoded identification number and, when the predetermined number of mismatches occurs, to operate abnormally.

32. The computer-readable medium of claim 31 that further contains instructions of a basic input/output system.

33. The computer-readable medium of claim 31 including instructions for causing the computer system to operate normally when the user inputs an identification number that matches the encoded identification number.

34. The computer-readable medium of claim 31 wherein the abnormal operating includes allowing execution by the computer system only of a secure program to obtain the identification number of the computer system.

35. The computer-readable medium of claim 34 wherein the computer system further includes communication devices and wherein the computer system executes the secure program to communicate with a remote computer system to obtain the identification number of the computer system.

36. The computer-readable medium of claim 31 wherein the abnormal operating includes reporting theft of the computer system.

37. The computer-readable medium of claim 31 wherein the abnormal operating includes obtaining identifying information from a user of the computer system and reporting the obtained identifying information.

38. The computer-readable medium of claim 31 wherein the abnormal operating includes enabling caller identification of a telephone number and dialing a telephone number so that the calling telephone number is available to the dialed telephone.

39. The computer-readable medium of claim 31 wherein the abnormal operating includes automatically powering down the computer system whenever the computer system is subsequently powered up.

40. A security method in a computer system comprising:
   encoding in the computer system an identification of the computer system, the encoding performed at a first location;
   transporting the computer system in a first shipment to a second location, the first shipment not having a user copy of the identification of the computer system;
   when the computer system is booted at least once after the transporting;
   prompting for input of the identification of the computer system;
   determining whether an input received matches the encoded identification to conclude that the input received is derived from the user copy of the identification of the computer system or whether an input received mismatches the encoded identification to conclude that the input received is not derived from the user copy of the identification of the computer system;
   when a match is determined, storing an indication of the match; and
   when a predetermined number greater than zero of mismatches are determined, performing a security measure.

41. The method of claim 40 wherein the storing of the indication of the match occurs before the predetermined number of mismatches are determined, the computer system no longer prompts for input of the identification of the computer system.

* * * * *